United States Patent [19]

Tada

[11] Patent Number: 4,695,938
[45] Date of Patent: Sep. 22, 1987

[54] INVERTER CONTROLLING METHOD

[75] Inventor: Hideaki Tada, Aichi, Japan

[73] Assignee: Mitsubishi Denki Kabushiki Kaisha, Tokyo, Japan

[21] Appl. No.: 751,547

[22] Filed: Jul. 3, 1985

[30] Foreign Application Priority Data

Jul. 5, 1984 [JP] Japan ................... 59-137877

[51] Int. Cl.⁴ ............................................. H02M 5/45
[52] U.S. Cl. ..................................... 363/37; 363/142; 318/802; 318/812
[58] Field of Search ................. 323/299; 318/801–803, 318/806, 812; 363/37, 80, 98, 142, 36

[56] References Cited

U.S. PATENT DOCUMENTS 4,437,050  3/1984  Overzet ........................... 318/807 X
4,480,299 10/1984  Muto et al. ....................... 318/802 X
4,555,750 11/1985  Matsumara et al. .................. 363/37

FOREIGN PATENT DOCUMENTS 48302  2/1983  Japan ................................. 318/801
48410 10/1984  Japan ................................. 318/801

Primary Examiner—Peter S. Wong
Assistant Examiner—Marc S. Hoff
Attorney, Agent, or Firm—Bernard, Rothwell & Brown

[57] ABSTRACT

An inverter controlling method comprising corresponding DC bus voltage after power inversion relating to commercial power supply voltage, and in a comparator, comparing both voltages, detecting the DC bus voltage at the time point when the both voltages are the same to discriminate and store the level of the commercial AC power supply voltage, and making correction of the output voltage at the next operational start of the inverter on the basis of the stored information.

4 Claims, 2 Drawing Figures

INVERTER CONTROLLING METHOD

BACKGROUND OF THE INVENTION

1. Field of the Invention

The invention relates to an inverter controlling method, and more particularly, to a method for automatically correcting variations in output voltage of inverter due to variations in power supply voltage.

2. Description of the Prior Art

Such an inverter controlling method used so far is shown FIG. 1, in which reference numeral 1 illustrates a commercial AC power supply, 2 a power rectifier, 3 a smoothing capacitor, 4 a power inverter, 5 an AC motor as a load, 6 a frequency setter for the inverter, 7 a soft start circuit, 8 a frequency controlling circuit, 9 a comparator for comparing the voltage instruction from the soft start circuit 7 with the output voltage of the later-mentioned inverter-output voltage detecting circuit 13 as set forth later, 10 an amplifier, 11 an inverter-output voltage controlling circuit, 12 a base drive circuit for the power inverter, and 13 an inverter-output voltage detecting circuit.

The mode of the operation of the prior art inverter-controlling method shown in FIG. 1 will be described below. AC power from the commercial power supply 1 is converted to DC power in the power rectifier 2, smoothed in the smoothing capacitor 3 and input into the power inverter 4. The power inverter 4 which, for example, consists of a transistor and other elements, reconverts the DC power supplied in response to the switching of the transistor into AC power having variable frequency and variable voltage, and thus causes the AC motor 5 as a load to run at variable speed. The control circuit for operating the power inverter 4 as a switch operates as follows. The analog frequency instruction signal provided by the frequency setter 6 is input into the soft start circuit 7 and there converted into two series of signals, one for controlling the output frequency of the inverter 4 and the other for controlling the output voltage. The frequency controlling signal series is supplied to the base drive circuit 12 through the frequency controlling circuit 8, and actuates the base drive circuit 12 to control the output frequency of the power inverter 4. The voltage controlling signal series is input into the comparator 9, and thereby is compared with the output signal of the inverter-output voltage detecting circuit 13, and amplified by the amplifier 10, then the thus-obtained signal is input into the base drive circuit 12 through a output voltage control circuit 11. The output signal of the frequency control circuit 8 is also input to the base drive circuit 12. Then the base drive circuit 12 is actuated to control the output voltage of the inverter 4.

The prior art inverter controlling circuitry of the construction above-described allows only slight variation in the output voltage due to the variation in power supply voltage by virtue of the effect of the closed-loop control on the output voltage. It, however, is defective in respect that the constructed closed-loop exerts inverse influence of impaired responsiveness of the output voltage control, and it employs complicated overall circuit.

SUMMARY OF THE INVENTION

It is a principal object of the invention to provide an inverter controlling method free from the above-mentioned defects or shortcomings involving the prior art and having an improved responsiveness of inverter output voltage control. The control method according to the invention comprises corresponding DC bus voltage after power inversion relatively to commercial power supply voltage, and in a comparator, comparing both voltages, detecting the above-mentioned DC bus voltage at the time point when the both voltages are the same to discriminate and store the level of the commercial AC power supply voltage, and making correction of the output voltage at the next operational start of the inverter on the basis of the stored information.

PREFERRED EMBODIMENT OF THE INVENTION

The invention will be more fully described by way of an embodiment with reference to the accompanying drawings hereinafter.

Figure 1:
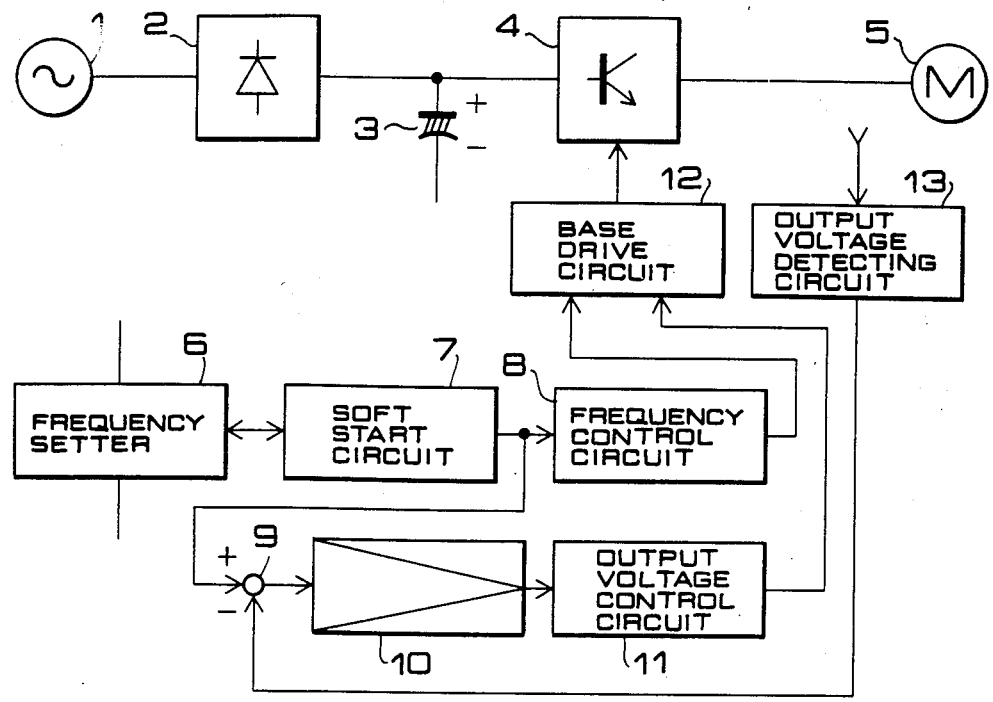
FIG. 1 is a block diagram of the control circuitry for performing a prior art inverter controlling method.
Figure 2:
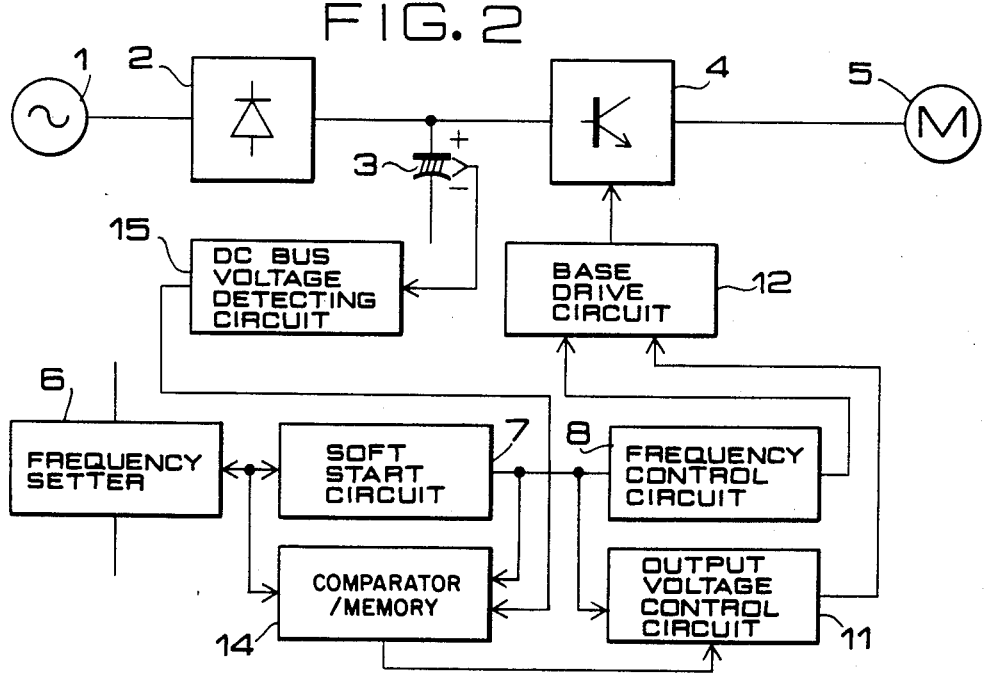
FIG. 2 is a block diagram of the control circuitry for performing an embodiment of inverter controlling method according to the invention.

In FIG. 2, identical parts to those shown in FIG. 1 are designated by the same reference numerals, and reference characters 14 and 15 indicate a comparatory memory for comparing input and output signals of the soft start circuit 7 and DC bus voltage detecting circuit, respectively.

Referring to FIG. 2, there will be described the operation of the circuit of wherein the operation of the main circuitry is the same as that of the prior art, and therefore its expression is omitted. Now, when the external frequency instruction signal output from the frequency setter 6 is supplied to the soft start circuit 7, the output frequency control signal which is output from the soft start circuit 7 increases gradually, and at the time point when the output frequency control signal is in accordance with the above-mentioned external frequency instruction signal, the comparator memory 14 for comparing input and output signals of the soft start circuit 7 stores the bus voltage signal from the DC bus voltage detecting circuit 15.

The thus-stored DC bus voltage is momentarily transmitted at the time point when an external frequency instruction signal is generated from the frequency setter 6 upon the next start of the inverter, as the power supply voltage information signal to the output voltage control circuit 11. The output signal of the output voltage control circuit 11 is corrected promptly, and thereby the output voltage of the inverter is corrected in conformance to the power supply voltage.

The reason for the above description that comparison and storing of the DC bus voltage is made to discriminate the power supply voltage at the time point of coincidence of frequency immediately after the AC motor has accelerated, resides in that when the AC motor is in a regenerated state, the regenerated energy is being returned to the inverter, which causes the DC bus voltage to rise beyond the power supply voltage, and in turn makes discrimination of true power supply voltage impossible. The discrimination therefore is intended to be performed at the time point when the AC motor is in power running under as similar condition to the starting condition as possible.

There will be described the advantages given by the features of the invention described above. Stable starting can be accomplished by only one correction per run cycle at starting, and accordingly though inappropriate for sharp variation in power supply voltage in relatively short time, safe connection to power supply can be ensured for example in Japan where different power supply voltages such as 200 V and 220 V, or 400 V and 440 V are adopted, because operation of AC motor can be started under the condition that discrimination of difference in voltage and correction based on it is automatically made.

What is claimed is:

1. A method for controlling an inverter apparatus which operates an AC motor by means of a power rectifier for converting a commercial AC voltage of a power supply into a DC voltage, and a power inverter for converting said DC voltage into a controlled AC voltage having variable frequency and variable voltage, the method comprising the following steps of:
   (a) supplying a soft start circuit with an external frequency instruction signal given by a frequency setter.
   (b) comparing input and output signals of said soft start circuit;
   (c) storing a bus voltage signal form a DC bus voltage detecting circuit when an output frequency control signal of said soft start circuit is equal in magnitude to said external frequency instruction signal;
   (d) instantaneously transmitting to an output voltage control circuit, upon the next start of said inverter apparatus, the stored DC but voltage as a power supply voltage information signal to thereby promptly correct an output of said output voltage control circuit; and
   (e) controlling the power inverter based upon the output of said output control circuit.

2. A method for controlling an inverter apparatus as defined in claim 1 wherein said DC bus voltage is detected from the DC voltage output of said power rectifier.

3. A method for controlling an inverter apparatus as defined in claim 1 wherein said AC power supply may have any different AC voltage of such as a voltage in the range form 200 V to 220 V or a voltage in the range from 400 V to 440 V.

4. An inverter apparatus for driving an AC motor comprising:
   (a) a power rectifier for converting an AC voltage of a commercial AC power supply to a DC voltage;
   (b) a power inverter for converting said DC voltage to an AC voltage of a variable frequency and a variable voltage to drive said AC motor;
   (c) a frequency setter which produces a voltage corresponding to a desired frequency condition of said inverter;
   (d) a soft start circuit connected to the frequency setter for producing an output frequency control signal which increases gradually;
   (e) a DC bus voltage detecting circuit for detecting a DC voltage of the output of said power rectifier; and
   (f) a comparator/memory circuit having inputs connected to respective outputs of the frequency setter, the soft start circuit and the DC bus voltage detecting circuit wherein the comparator/memory circuit stores the output signal of said DC bus voltage detecting circuit when the output of said soft start circuit is equal in magnitude to the output of the frequency setter, and the comparator/memory outputs the stored DC bus voltage signal upon the next start of an output signal from the frequency setter;
   (g) a base drive circuit connected to said power inverter for operating the power inverter;
   (h) a frequency control circuit having an input connected to the output of the soft start circuit and having an output connected to a frequency control input of said base drive circuit; and
   (i) an output voltage control circuit having respective inputs connected to the output of the soft start circuit and the output of the comparator/memory circuit and having an output connected to a voltage control input of said base drive circuit for producing a corrected voltage control signal in conformity to the AC power supply.

* * * * *